United States Patent [19]

Träff et al.

[11] Patent Number: 5,370,043
[45] Date of Patent: Dec. 6, 1994

[54] HIGH-PRESSURE PRESS WITH PRESSURE RELIEVED CYLINDER ELEMENT

[75] Inventors: Anders Träff; Carl Bergman, both of Västerås, Sweden

[73] Assignee: Asea Brown Boveri AB, Västerås, Sweden

[21] Appl. No.: 143,141

[22] Filed: Oct. 29, 1993

[30] Foreign Application Priority Data

Nov. 4, 1992 [SE] Sweden .................. 9203293-7

[51] Int. Cl.$^5$ .............................................. A23L 3/00
[52] U.S. Cl. ......................................... 99/467; 99/485; 99/323.1
[58] Field of Search ............... 99/467, 485, 323.1, 99/323.2, 452, 484, 483, 468, 470, 472

[56] References Cited

U.S. PATENT DOCUMENTS

| | | |
|---|---|---|
| 1,269,562 | 6/1918 | Witzel . |
| 3,490,344 | 1/1970 | Archer . |
| 5,208,058 | 5/1993 | Kotani .................. 99/467 |
| 5,213,029 | 5/1993 | Yutaka .................. 99/467 |

FOREIGN PATENT DOCUMENTS

| | | |
|---|---|---|
| 1752740 | 8/1975 | Germany . |
| 1038907 | 8/1966 | United Kingdom . |

*Primary Examiner*—Robert W. Jenkins
*Attorney, Agent, or Firm*—Burns, Doane, Swecker & Mathis

[57] ABSTRACT

A high-pressure press, preferably for treatment of foodstuffs by high-pressure, comprising a cylinder element (20), provided in a vessel volume (4) of a pressure vessel (1), with a movable piston (24). The cylinder element is arranged with a gap (21) in relation to the surrounding pressure vessel wall (8), such that the same pressure prevails inside the cylinder element as outside thereof.

18 Claims, 2 Drawing Sheets

HIGH-PRESSURE PRESS WITH PRESSURE RELIEVED CYLINDER ELEMENT

FIELD OF THE INVENTION

The present invention relates to a device for pressurizing substances, for example foodstuffs, pharamaceuticals and cosmetics, comprising a cylinder element and a pair of end members which together define a pressure chamber, at least one of the end members being formed of a piston which is axially displaceable in the cylinder element and which seals against the cylinder wall.

BACKGROUND OF THE INVENTION

In recent years, high-pressure treatment has started to be utilized as a method for, among other things, inactivating microorganisms (e.g. bacteria) in foodstuffs, especially foodstuffs such as fruit juices and the like which have a particularly high quality. The advantage of high-pressure treatment as compared with the more frequently used heat-treatment method is that the microorganisms in the freshly pressed juice are inactivated without destroying vitamins and flavouring, which occurs during heat treatment and which requires additives in the heat-treated juice to restore, as tier as possible, the nutritive value and taste of the freshly pressed juice.

During high-pressure treatment of foodstuffs, it is desirable that the surfaces in the pressure chamber, with which the foodstuff may come into contact, be made of a material which is inert in relation to the foodstuff. An example of such a material is stainless steel. The problem with stainless steel, however, is that its strength is considerably lower than the strength of the high-strength, non-stainless steels from which pressure vessels for high pressures are normally manufactured. This means, among other things, that an upper limit to the pressure, to which foodstuffs have hitherto been capable of being subjected for the above-mentioned purpose, has been at around 4000 bar. Pressures of this order of magnitude are sufficient to inactivate microorganisms, but not to inactivate enzymes, which, for example, as far as fruit juices are concerned, contribute to separate the juice. Nor are these pressures sufficient to inactivate spores.

OBJECTS AND SUMMARY OF THE INVENTION

The present invention aims to provide a device of the kind described in the introduction, which is particularly but not exclusively intended for treatment of foodstuffs up to pressures of the order of magnitude of 14,000 bar in order to make possible, among other things, also to inactivate enzymes and spores during high-pressure treatment.

The above is achieved according to the invention by fixing the cylinder element in a vessel volume, filled with a pressure medium, in a pressure vessel in such a way that a gap is formed between the outer envelope surface of the cylinder element and the inner wall of the pressure vessel, which gap communicates with a space on the outside of the above-mentioned piston to create the same pressure medium pressure on the outside of the cylinder as on the outside of the piston.

By an embodiment as described above, a cylinder element is achieved which is completely relieved of pressure, since the pressure of the substance on the inside of the piston, serving as a movable wall of the pressure chamber, during movement of the piston to a balanced position becomes equal to the pressure of the pressure medium on the outside of the piston, which pressure also prevails in the gap on the outside of the cylinder element and balances the pressure of the substance against the tuner wall of the cylinder element. Thus, the embodiment makes it possible to use a pressure vessel of high-strength, non-stainless steel which withstands the stresses which arise at pressures up to 14,000 bar and thereabove, and a cylinder element of a low-strength material, for example stainless steel, which is inert in relation to the substances which are to be treated by pressure, so that substances in the cylinder element cannot be precipitated in the foodstuff which has been treated by pressure and give flavour thereto.

BRIEF DESCRIPTION OF THE DRAWING FIGURES

The invention will be described in greater detail with reference to the embodiments shown on the accompanying drawings, wherein FIG. 1 shows a longitudinal section through a schematically represented high-pressure press according to the invention, and FIG. 2 shows a slightly modified embodiment of the press in FIG. 1.

DETAILED DESCRIPTION OF THE INVENTION

Figure 1:
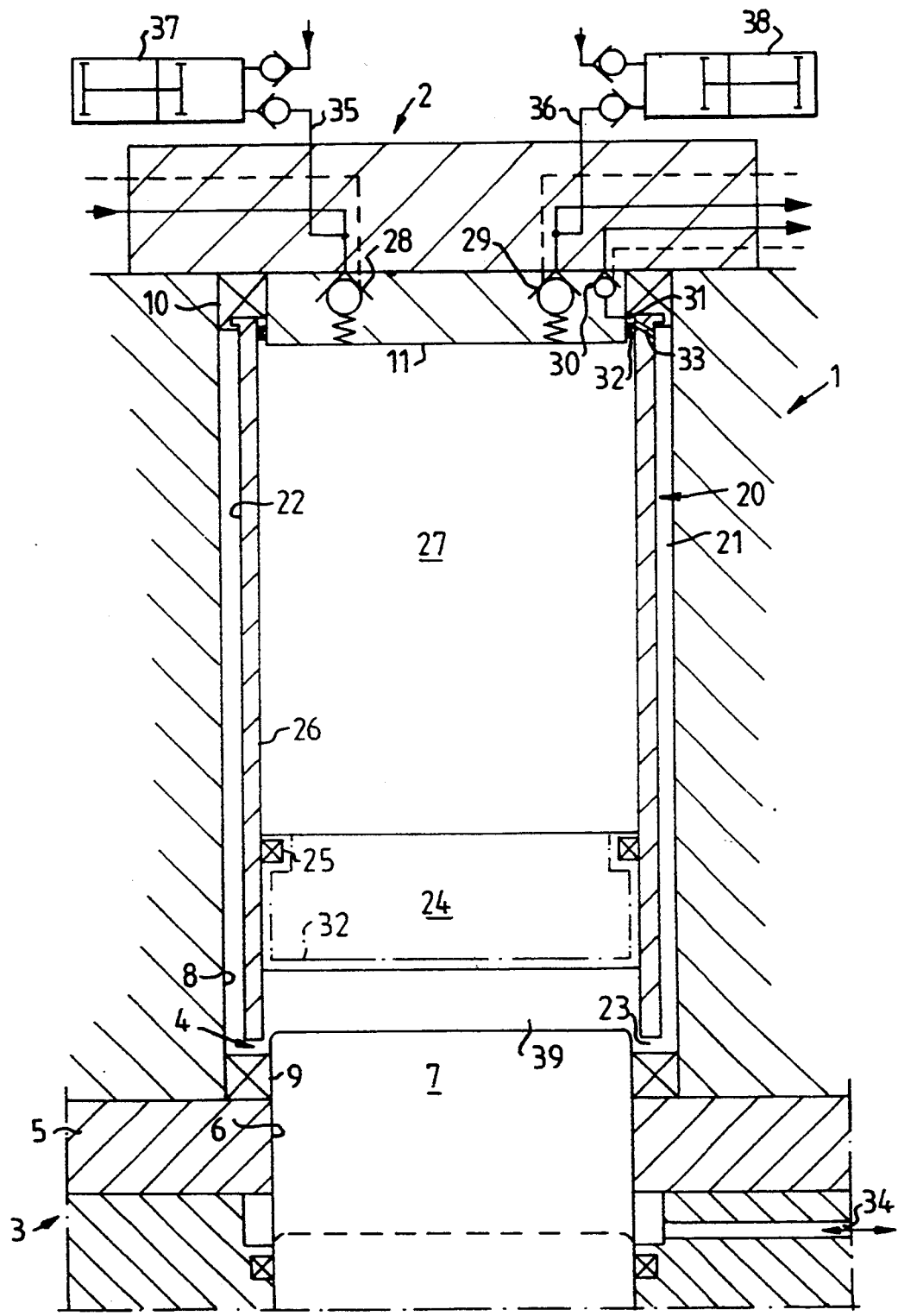

In the figure, 1 designates a pressure vessel, comprising a thick-walled cylinder of high-strength steel which may be prestressed by means of a prestressed steel wire wound in a conventional manner around the cylinder. Together with an upper end member 2 and a lower end member 3, the pressure vessel 1 defines a vessel volume 4. The lower end member 3 comprises a plate 5 with a cylindrical opening 6 for a punch 7 which is connected to a hydraulic piston-cylinder arrangement (not shown in detail). Between the punch 7 and the cylindrical wall 8 of the pressure vessel 1, a high-pressure seal 9, known per se, is fixed. A corresponding high-pressure seal 10 is fixed to the upper end of the pressure vessel 1, between the wall 8 and a portion 11 of the upper end member 2, said portion 11 projecting down into the vessel volume 4.

What has been described above constitutes the prior an within the field of high-pressure presses. According to the invention, a cylinder element 20, which maze consist of a material different from the material in the cylinder 1, is fixed in the vessel volume 4 so as to form a gap 21 between the pressure vessel wall 8 and the outer surface 22 of the cylinder element 20. In the embodiment shown, the cylinder element 20, which preferably consists of stainless steel, is suspended from the upper high-pressure seal 10 so as to form a gap 23 between the lower seal 9 and the lower edge of the cylinder element 20.

In the cylinder element 20, a free moving piston 24 is displaceably housed The piston 24 is provided with a seal 25, which seals against the inner envelope surface 26 of the cylinder element, and together with the cylinder element 20 and the end member 2 the piston defines a pressure chamber 27 for substances to be treated by pressure.

The press shown in the figure is intended for pumpable substances as, for example, juices or sauces and exhibits an inlet valve 28 and an outlet valve 29 in the upper end member 2. These valves are hydraulically operated valves with a nonreturn valve function, as shown in the figure. A further hydraulic valve 30 with a nonreturn valve function is arranged in the end member 2. Via the valve 30, an annular gap 31 above a seal 32 and a channel 33 in the cylinder element, fluid can be drained from the gap 21. Via a channel 34 in the lower end member 3, pressure fluid from a low-pressure pump (not shown) can be supplied when the punch 7 is returned to its position indicated by dash-dotted lines. Lines 35 and 36, respectively, for cleaning liquid, for example water, open out into the respective inlet and outlet valves 28, 29 and communicate with pumps 37 and 38, respectively.

In an alternative embodiment (not shown), the punch 7 comprises pressure media channels which connects the vessel volume (4) with an outside pump, also where the punch 7 is inserted into the vessel volume (4).

The mode of operation of the press is as follows:

Upon start-up of a working cycle, the punch 7 is in the lower position shown by dashdotted lines. A predetermined volume of the product which is to be treated by pressure is now supplied to the pressure chamber 27 via the inlet valve 28. Thereafter, the vessel volume 4 is supplied with pressure medium with a pressure of the order of magnitude of up to 200 bar via the channel 34, the product in the pressure chamber thus being precompressed when the piston moves upwards, such that the volume of air contained in the system is practically eliminated. Increase of pressure up to the previously mentioned pressures in the order of magnitude of 14,000 bar is then obtained by pressing the punch 7 with the aid of the piston-cylinder arrangement (not shown) a predetermined distance into the vessel volume 4. The pressure in the vessel volume 4, that is, in the gap 21 and in the space 39 on the outside of the piston 24, will thereby be equal to the pressure in the pressure chamber 27, the cylinder element thus being completely relieved of pressure differences.

According to an alternative embodiment (not shown) the punch 7 is during the whole operation in its upper position, projecting into the vessel volume. In fact, the punch 7 may in this embodiment be non-movable. This punch comprises pressure media channels, which connects the vessel volume 4 with an outside pump, through the punch 7. With this embodiment it is possible to obtain high pressures in the vessel volume, without moving the punch 7. The high pressure is instead obtained by utilizing a high pressure pump, which supplies pressure media at presssures up to about 6,000 bar into the vessel volume, trough the pressure media channels comprised in the punch 7.

When the product has been treated by pressure for a predetermined period of time, the punch 7 is restored to its original position, whereupon the outlet valve 29 is opened. The product can now be pressed out by the piston 24 by supplying additional pressure medium to the vessel volume 4 via the channel 34. Any leakage of product substance from the pressure chamber 27 can be drained by opening the valve 30 for a short period, thus ensuring that the vessel volume 4 in its entirety is filled with the current pressure medium only, which preferably is an "eatable" oil, for example olive oil or castor oil, which has good lubrication qualities, but the pressure medium can also be pure water if seals with self-lubricating properties are used. The piston 24 is restored to its original position during the subsequent filling of the next volume of the product while draining pressure medium from the vessel volume 4 via the channel 34. If the product contains solid substances, which may adhere to the valves 28, 29, these may be cleaned prior to the next work cycle by spraying water into the valves via the channels 35 and 36, respectively.

In an alternative embodiment (not shown) of the press, intended for pressure treatment of batches of non-pumpable products, for example prepacked solid foodstuffs, the valve arrangement in the upper end member 2 is replaced by an opening provided with a lid, through which opening the products are supplied and removed.

Instead of fixing the cylinder element 20 suspended from the upper high-pressure seal 10 with a gap 23 between its lower edge and the lower high-pressure seal 9, the cylinder element 20 can rest against the lower seal and be provided with channels, which connect the space 39 with the gap 21.

The width of the gap 21 is to be so adapted to the viscosity of the pressurized pressure medium and the deformation of the pressure vessel 1, caused by the compressive stress in the pressure vessel, that the contraction of the pressure vessel during pressure relief does not cause throttling of the flow in the gap with an ensuing too great nonuniformity in the distribution of pressure.

Figure 2:
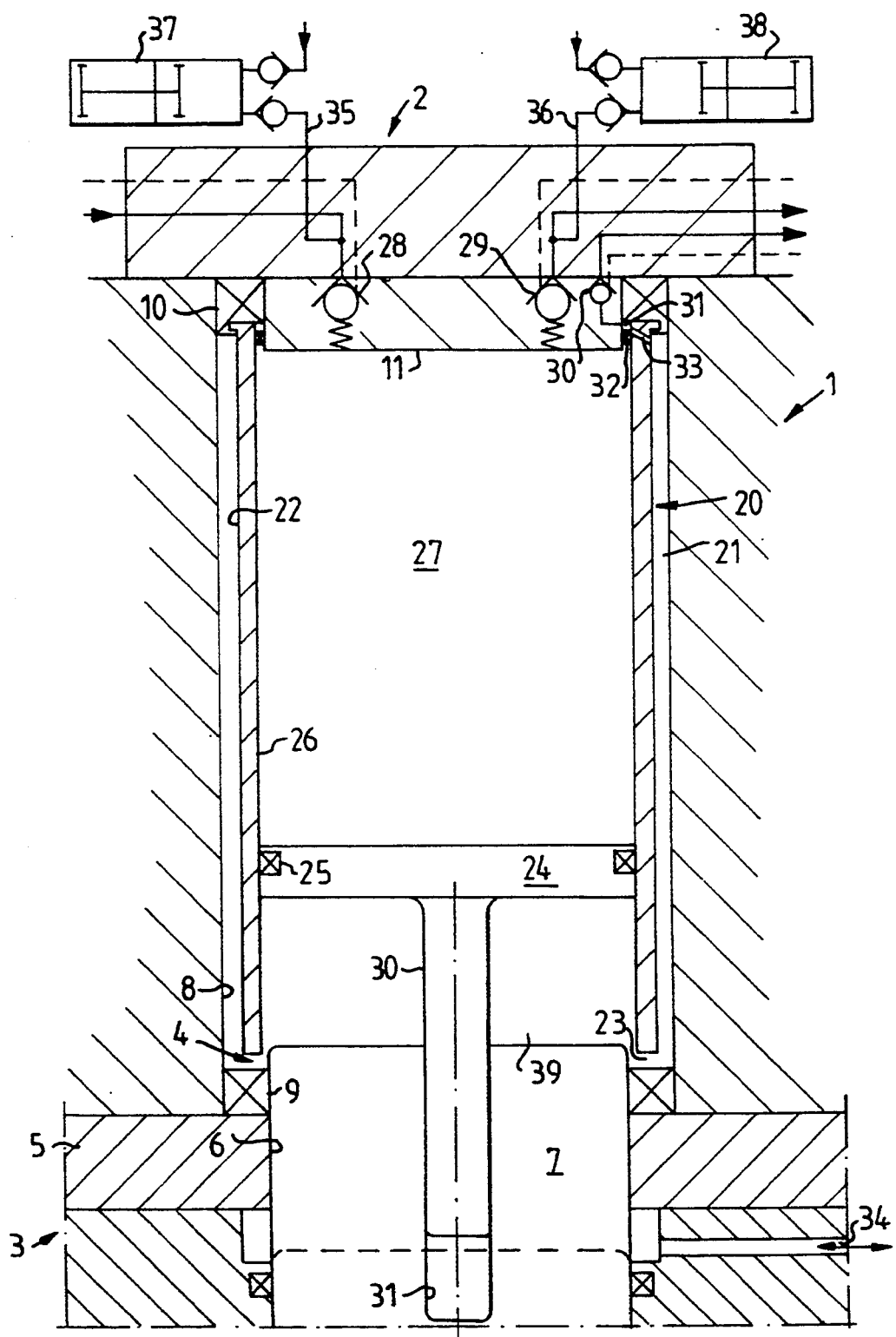

FIG. 2 shows an embodiment of a high-pressure press according to the invention which differs from the one described above in that the piston 24 is shorter in the axial direction to increase the available volume in the chamber 27. To eliminate the risk of the piston becoming wedged, the piston is connected to a guide pin 30 which is provided in a bore 31 in the punch 7.

An alternative for increasing the volume of the pressure chamber 27 without risking locking of the piston 24 is also shown in FIG. 1, where the dash dotted line 32 indicates a cup-shaped design of the piston. In both of the alternative embodiments of the piston 24, emptying of the chamber is required in some other way than what has been described above, for example by supplying a gas, such as $CO_2$, to the chamber through an inlet disposed at a suitable location.

We claim:

1. A device for pressurizing substances, comprising a pressure vessel having a vessel wall defining a vessel volume for being filled with a pressure medium, a cylinder element having a cylinder wall, a pair of end members, the cylinder element and the end members together defining a pressure chamber, at least a first one of the end members being a piston which is axially displaceable in the cylinder element and which seals against the cylinder wall, the cylinder element being secured in the pressure vessel so that a gap exists between an outer envelope surface of the cylinder element and an inner surface of the vessel wall of the pressure vessel, said gap communicating with a space on an outside of said piston to create the same pressure medium pressure on the outside of the cylinder element as on the outside of the piston.

2. A device according to claim 1, wherein the cylinder element is formed of a material which is inert in relation to the substance which is to be pressurized, the vessel wall of the pressure vessel being formed of high-strength steel.

3. A device according to claim 2, wherein the cylinder element is formed of stainless steel.

4. A device according to claim 3, wherein a second one of the end members includes a device for supplying the substance which is to be pressurized and a device for removing the substance which is pressurized.

5. A device according to claim 4, wherein said devices are with a nonreturn function.

6. A device according to claim 4, including a channel formed in a bottom member that is mounted in the pressure vessel for supplying pressure medium to the vessel volume to displace said piston a first distance against a force produced by pressure in the pressure chamber to a first predetermined pressure level, and a movable member disposed inside the cylinder element for effecting a further pressure increase in the vessel volume above said first predetermined pressure level.

7. A device according to claim 3, including a channel formed in a bottom member that is mounted in the pressure vessel for supplying pressure medium to the vessel volume to displace said piston a first distance against a force produced by pressure in the pressure chamber to a first predetermined pressure level, and a movable member disposed inside the cylinder element for effecting a further pressure increase in the vessel volume above said first predetermined pressure level.

8. A device according to claim 2, wherein a second one of the end members includes a device for supplying the substance which is to be pressurized and a device for removing the substance which is pressurized.

9. A device according to claim 8, wherein said devices are hydraulically operated valves with a nonreturn function.

10. A device according to claim 8, including a channel formed in a bottom member that is mounted in the pressure vessel for supplying pressure medium to the vessel volume to displace said piston a first distance against a force produced by pressure in the pressure chamber to a first predetermined pressure level, and a movable member disposed inside the cylinder element for effecting a further pressure increase in the vessel volume above said first predetermined pressure level.

11. A device according to claim 2, including a channel formed in a bottom member that is mounted in the pressure vessel for supplying pressure medium to the vessel volume to displace said piston a first distance against a force produced by pressure in the pressure chamber to a first predetermined pressure level, and a movable member disposed inside the cylinder element for effecting a further pressure increase in the vessel volume above said first predetermined pressure level.

12. A device according to claim 1, wherein a second one of the end members includes a device for supplying the substance which is to be pressurized and a device for removing the substance which is pressurized.

13. A device according to claim 12, wherein said devices are hydraulically operated valves with a nonreturn function.

14. A device according to claim 13, including a channel formed in a bottom member that is mounted in the pressure vessel for supplying pressure medium to the vessel volume to displace said piston a first distance against a force produced by pressure in the pressure chamber to a first predetermined pressure level, and a movable member disposed inside the cylinder element for effecting a further pressure increase in the vessel volume above said first predetermined pressure level.

15. A device according to claim 12, including a channel formed in a bottom member that is mounted in the pressure vessel for supplying pressure medium to the vessel volume to displace said piston a first distance against a force produced by pressure in the pressure chamber to a first predetermined pressure level, and a movable member disposed inside the cylinder element for effecting a further pressure increase in the vessel volume above said first predetermined pressure level.

16. A device according to claim 1, including a channel formed in a bottom member that is mounted in the pressure vessel for supplying pressure medium to the vessel volume to displace said piston a first distance against a force produced by pressure in the pressure chamber to a first predetermined pressure level, and a movable member disposed inside the cylinder element for effecting a further pressure increase in the vessel volume above said first predetermined pressure level.

17. A device according to claim 16, wherein said movable member comprises a piston element which is insertable into the vessel volume by means of an external force.

18. A device according to claim 17, wherein said piston element comprises pressure media channels which connect the vessel volume with an outside pump.

* * * * *